3,757,007
PRODUCTION OF ε-CAPROLACTAM AND
O-ACETYL CYCLOHEXANONE OXIME
Isamu Fujita, Ikeda, Tooru Yoneya, Toyonaka, and
Shinichi Deguchi, Settsu, Japan, assignors to Kanega-
fuchi Boseki Kabushiki Kaisha, Tokyo, Japan
No Drawing. Filed Aug. 10, 1971, Ser. No. 172,342
Claims priority, application Japan, Aug. 26, 1970,
45/74,668
Int. Cl. C07d 41/06
U.S. Cl. 260—239.3 A                 5 Claims

ABSTRACT OF THE DISCLOSURE

A process for producing ε-caprolactam and O-acetyl-cyclohexanone oxime comprising reacting 0.01 to 100 mols of cyclohexanone oxime with one mol of N-acetylcaprolactam at a temperature of 30 to 120° C. for 10 minutes to 100 hours in the presence of an organic solvent in an amount of 0 to 20 times the total weight of N-acetylcaprolactam and cyclohexanone oxime.

---

This invention relates to a process for producing ε-caprolactam and O-acetylcyclohexanoneoxime.

There are known some processes for producing ε-caprolactam are already known, but they are mostly through Beckmann's rearrangement of cyclohexanoneoxime. The process utilizing the Beckmann's rearrangement reaction is advantageous and has been industrially put into practice. However, this process has a drawback that a large amount of ammonium sulfate is by-produced in the reaction system and it is necessary to take the treatment or disposition of ammonium sulfate into consideration.

We have made extensive researches and experiments to develop a process for industrially easily and advantageously producing ε-caprolactam without by-producing ammonium sulfate. As a result, we have found that there is a peculiar reactivity between cyclohexanoneoxime and N-acetylcaprolactam. This invention is based on this finding.

According to the present invention, ε-caprolactam and O-acetylcyclohexanoneoxime are obtained from cyclohexanoneoxime and N-acetylcaprolactam.

It is known that O-acetylcyclohexanoneoxime may be synthesized by acetylating cyclohexanoneoxime with acetic anhydride. However such process has never been industrially carried out because the use of O-acetylcyclohexanoneoxime has not been established. However, we have found that, under a proper condition (in a gaseous phase catalytic reaction by the use of a silica alumina catalyst), even if no sulfuric acid is used, O-acetylcyclohexanoneoxime will easily cause Beckmann's rearrangement to give N-acetylcaprolactam at a high yield.

Therefore, O-acetylcyclohexanoneoxide produced by the process of the present invention may be subjected to such Beckmann's process to convert the same to N-acetylcaprolactam, which can be used again as the starting material for the process of the present invention. Therefore, the present invention is a new process enabling the production of ε-caprolactam from cyclohexanoneoxime easily at a high yield and purity without by-producing ammonium sulfate, and is very high in the industrial value.

Therefore the primary object of the present invention is to provide a novel process for producing ε-caprolactam and O-acetylcyclohexanoneoxime.

Another object of the present invention is to provide a novel whereby ε-caprolactam and O-acetylcyclohexanoneoxime can be produced simultaneously, easily and cheaply.

Briefly, the above objects are attained by heating N-acetylcaprolactam and cyclohexanoneoxime in a liquid phase.

The reaction of the present invention is shown by the following formula:

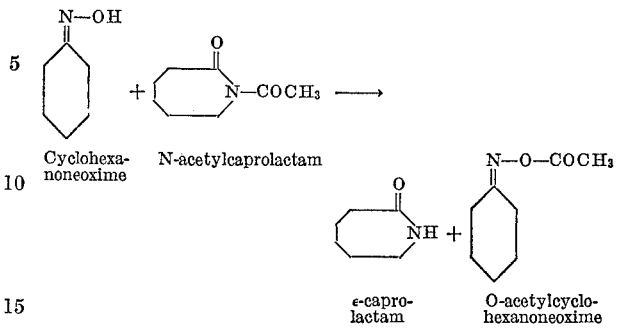

Cyclohexa-   N-acetylcaprolactam
noneoxime

ε-capro-   O-acetylcyclo-
lactam    hexanoneoxime

Thus, when cyclohexanoneoxime and N-acetylcaprolactam are mixed and heated, together, there occurs a reaction between them to produce ε-caprolactam and O-acetylcyclohexanoneoxime simultaneously.

The reaction of the present invention may be carried out by agitating and heating at a predetermined temperature a mixture of predetermined proportions of cyclohexanoneoxime and N-acetylcaprolactam, with or without the addition of a solvent.

Among the factors influencing this reaction are the reaction temperature of the reactants and kind of solvent, etc.

Usually, the temperature may be in a range of 30 to 120° C., preferably 60 to 100° C. The higher the reaction temperature, the higher the reaction velocity and therefore the shorter the reaction time. However, if the temperature is higher than 120° C., an identified secondary reaction will occur and the yield of the desired products will reduce. When the reaction temperature is lower than 30° C., the reaction velocity will be low so that a long time will be required and the yield of the products will reduce.

The reaction time is influenced by the reaction temperature and may range from several minutes to 80 hours or more. For example, in case the reaction temperature is 120° C., the reaction velocity will be so high that the reaction will be almost completed in a few hours. However, if the reaction is continued any longer, there is a tendency that the selectivity of the products, particularly O-acetylcyclohexanoneoxime will reduce. Therefore in the case of a reaction temperature of 120° C., the reaction time will be usually in a range of 10 minutes to 3 hours. Further, in case the reaction temperature is 30° C., the reaction velocity will be so low that the reaction time will be required to be, for example, several tens of hours. However, if the reaction is continued too long, the selectivity of O-acetylcyclohexanoneoxime will reduce. The reaction time in this case is usually 60 to 100 hours.

Thus the preferable reaction time is different depending on the particular reaction temperature but is generally in a range of 10 minutes to 100 hours, particularly 1 to 80 hours or more preferably 3 to 60 hours.

The proportion of the starting materials, i.e. N-acetyl-caprolactam and cyclohexanoneoxime is preferable to be in a range of 0.01 to 100 mols, particularly 0.1 to 30 mols or more preferably 0.2 to 5 mols of cyclohexanoneoxime per mol of N-acetylcaprolactam.

The reaction product is generally a mixture of ε-caprolactam, O-acetylcyclohexanoneoxime and unreacted N-acetylcaprolactam and cyclohexanoneoxime. However, if either one of N-acetylcaprolactam and cyclohexanoneoxime is used in excess of the other, the amount of the other reactant used in the minor amount will become small in the reaction product so that the mixture will be substantially of three components and therefore the operation required for separating these components will become easy. However, if one reactant is extremely small in relation to the other, there will be caused disadvantage that the yield of ε-caprolactam and O-acetylcyclohexanoneoxime will reduce. Therefore, the above mentioned range is preferable.

N-acetylcaprolactam is liquid at room temperature but cyclohexanoneoxime is a solid having a melting point of 90° C. Therefore, when cyclohexanoneoxime is used in excess, it will be difficult for the mixture to become a uniform liquid system and the initial reaction rate will be slow. Therefore, in such case, it is preferable to make vigorous agitation so that the cyclohexanoneoxime may be kept dispersed and may be dissolved with the progress of the reaction. Alternatively it is preferable to heat the reaction system to a temperature close to or higher than the melting point of the cyclohexanoneoxime or to dissolve the cyclohexanoneoxime in an organic solvent.

The organic solvent should be selected from those which are inert to cyclohexanoneoxime and N-acetylcaprolactam and also to the products, i.e. O-acetylcyclohexanoneoxime and ε-caprolactam. Examples of such solvents are aromatic, alicyclic or aliphatic hydrocarbons and their halides or ethers, acetals, esters or ketones. More particular examples of hydrocarbons are benzene, toluene, xylene, ethylbenzene, diethylbenzene, isopropylbenzene, amylbenzene, tetralin, Decalin, biphenyl, petroleum ether, petroleum benzine, ligroin, pentane, hexane, heptane, octane, cyclohexane and methylcyclohexane. The halides are, for example, methyl chloride, methylene chloride, chloroform, carbon tetrachloride, ethyl chloride, ethylene chloride, ethylidene chloride, trichlorethane, tetrachlorethane, pentachlorethane, hexachlorethane, vinylidene chloride, dichlorethylene, trichlorethylene, tetrachlorethylene, trichloropropane, isopropyl chloride, allyl chloride, dichloropropane, butyl chloride, amyl chloride, dichloropentane, hexyl chloride, 2-ethylhexyl chloride, methyl bromide, ethyl bromide, ethylene bromide, tetrabromomethane, chlorobromomethane, ethylene chlorobromide, chlorobenzene, dichlorobenzene, trichlorobenzene, bromobenzene, dibromobenzene and chlorotoluene. The ethers and acetals are, for example, ethylether, dichlorethylether, isopropylether, butylether, diisoamylether, methylphenylether, ethylphenylether, butylphenylether, ethylbenzylether, tetrahydrofuran, tetrahydropiran, dioxane, dimethylacetal and diethylacetal. The esters are, for example, methyl formate, ethyl formate, propyl formate, butyl formate, amyl formate, methyl acetate, ethyl acetate, propyl acetate, butyl acetate, amyl acetate, hexyl acetate, cyclohexyl acetate, benzyl acetate, methyl propionate, ethyl propionate, propyl propionate, butyl propionate, amyl propionate, methyl butyrate, ethyl butyrate, propyl butyrate, butyl butyrate, amyl butyrate, methyl benzoate and ethyl benzoate. The ketones are, for example, acetone, methylethyl ketone, diethyl ketone, dipropyl ketone, methylpropyl ketone, ethylpropyl ketone, dibutyl ketone, methylbutyl ketone, ethylbutyl ketone and propylbutyl ketone.

The amount of the solvent may be in a range of 0 to 20 times, preferably 0.1 to 10 times the total weight of the starting materials, i.e. N-acetylcaprolactam and cyclohexanoneoxime.

Further, when such organic solvent is used, the amounts of ε-caprolactam and O-acetylcyclohexanoneoxime in the reaction product will increase to be larger than when no solvent is used. Therefore the yield of the desired products will increase. Therefore, the use of the solvent is preferable.

As pointed out before, the product of the reaction conducted under the conditions explained hereinbefore would generally be a mixture of ε-caprolactam and O-acetylcyclohexanoneoxime, and unreacted N-acetylcaprolactam and cyclohexanoneoxime.

From such reaction product mixture, ε-caprolactam and O-acetylcyclohexanoneoxime may be separated in such conventional manner as distillation, extraction or crystallization, and the cyclohexanoneoxime and N-acetylcaprolactam may be returned to the reaction system so as to be used as starting materials.

If desired, as explained before, O-acetylcyclohexanoneoxime may be converted by Beckmann's rearrangement into N-acetylcaprolactam, which may be cycled back to the initial reaction system so that finally ε-caprolactam can be easily produced at a high yield from cyclohexanoneoxime without the by-production of ammonium sulfate.

The present invention will be explained more particularly with reference to the following examples in which the yield, selectivity and conversion are determined as follows:

$$\text{Yield (percent) of }\epsilon\text{-caprolactam} = \frac{\text{Amount of produced }\epsilon\text{-caprolactam (mols)}}{\text{Amount of material N-acetylcaprolactam (mols)}} \times 100$$

$$\text{Selectivity (percent) of }\epsilon\text{-caprolactam} = \frac{\text{Amount of produced }\epsilon\text{-caprolactam}}{\text{Amount (mols) of material N-acetylcaprolactam} - \text{amount (mols) of unreacted N-acetylcaprolactam}} \times 100$$

$$\text{Yield (percent) of O-acetylcyclohexanoneoxime} = \frac{\text{Amount of produced O-acetylcyclohexanoneoxime (mols)}}{\text{Amount of material cyclohexanoneoxime (mols)}} \times 100$$

$$\text{Selectivity (percent) of O-acetylcyclohexanoneoxime} = \frac{\text{Amount of produced O-acetylcyclohexanoneoxime (mols)}}{\text{Amount of material cyclohexanoneoxime (mols)} - \text{amount of unreacted cyclohexanoneoxime (mols)}} \times 100$$

$$\text{Conversion (percent) of N-acetylcaprolactam} = \frac{\text{Amount (mols) of reacted N-acetylcaprolactam}}{\text{Amount (mols) of materal N-acetylcaprolactam}} \times 100$$

$$\text{Conversion (percent) of cyclohexanoneoxime} = \frac{\text{Amount of (mols) of reacted cyclohexanoneoxime}}{\text{Amount (mols) of material cyclohexanoneoxime}} \times 100$$

EXAMPLE 1

A two-mouthed flask reactor (capacity of 100 cc.) was fitted with a reflux condenser provided with a calcium chloride drying tube. A glass-coated rotor for electromagnetic agitation was mounted in the flask.

11.3 g. (0.1 mol) of cyclohexanoneoxime and 15.5 g. (0.1 mol) of N-acetylcaprolactam were charged in the reactor and the reactor was heated on an oil bath at 80° C. so as to allow the reaction while being electromagnetically agitated. From time to time, the reaction mixture was taken out and its composition was analyzed with a gas chromatograph (PEG 20,000 column, at 150° C.).

The results of the analyses are shown in Table 1.

TABLE 1

| | Mol percent | | | |
|---|---|---|---|---|
| | Cyclohexanoneoxime | N-acetylcaprolactam | ε-Caprolactam | O-acetyl cyclohexanoneoxime |
| Reaction time (hours): | | | | |
| 0 | 50 | 50 | 0 | 0 |
| 3 | 22 | 23 | 26.5 | 27 |
| 5 | 17 | 19 | 29.5 | 31 |
| 8 | 14 | 14.5 | 32 | 31.5 |

As apparent from the above, in 8 hours of the reaction time, a reaction product solution having a composition of about 32 mol percent of each of ε-caprolactam and O-acetylcyclohexanoneoxime was obtained. This corresponded to a yield of ε-caprolactam of 64%, its selectivity of 91%, yield of O-acetylcyclohexanoneoxime of 64% and its selectivity of 89%.

Then 20 g. of the reaction product mixture were subjected to rectification to separate the respective components and to identify them. Thus, as a result of the distillation, there were obtained 2.0 g. of a cyclohexanoneoxime fraction (boiling point 104 to 105° C., 12 mm. Hg), 14 g. of an N-acetylcaprolactam fraction (boiling point 82 to 83° C., 4 mm. Hg), 5.1 g. of an O-acetylcyclohexanoneoxime fraction (boiling point 85 to 86° C., 4 mm. Hg) and 5.3 of an ε-caprolactam fraction (boiling point 101 to 102° C., 4 mm. Hg). The respective structures of these fractions were identified from the fact that their retention times of the gas chromatography and infrared spectra perfectly coincided with those of the respective authentic samples.

Further, whether N-acetylcaprolactam and cyclohexanoneoxime were produced from ε-caprolactam and O-acetylcyclohexanoneoxime or not was investigated. Thus, 0.1 mol of ε-caprolactam and 0.1 mol of O-acetylcyclohexanoneoxime were mixed together and the mixture was heated at 80° C. for 10 hours and then the product was analyzed with gas chromatography. As a result, only ε-caprolactam and O-acetylcyclohexanoneoxime were found but the presence of N-acetyl caprolactam and cyclohexanoneoxime was not detected at all. It was confirmed therefore that no reverse reaction would occur.

EXAMPLE 2

Experiments were conducted in the same manner as in Example 1 except that the reaction temperature and reaction time were varied. The results obtained by separating the reaction product mixture into respective components by gas chromatographic analysis and rectification are shown in Table 2.

As apparent from Table 2, when the reaction temperature is lower than 30° C., the reaction velocity will be so low that, even if the reaction is continued for more than 100 hours, the conversion of N-acetylcaprolactam is still low and the selectivity of O-acetylcyclohexanoneoxime is reduced. When the reaction temperature is higher than 120° C., the reaction velocity will become remarkably high but the selectivity of the desired product will quickly reduce. Therefore, the reaction temperature is preferable to be in a range of 30 to 120° C., particularly 60 to 100° C.

TABLE 2

| Reaction temperature (° C.) | Reaction time (hours) | Conversion of N-acetyl-caprolactam (Percent) | Selectivity of ε-capro-lactam (Percent) | Selectivity of O-acetylcyclo hexanoneoxime (Percent) |
|---|---|---|---|---|
| 25 | 60 | 4 | 82 | 81 |
|  | 100 | 8 | 83 | 75 |
|  | 120 | 13 | 75 | 49 |
| 30 | 60 | 11 | 86 | 83 |
|  | 100 | 18 | 83 | 72 |
|  | 120 | 23 | 79 | 51 |

TABLE 2—Continued

| Reaction temperature (° C.) | Reaction time (hours) | Conversion of N-acetyl-caprolactam (Percent) | Selectivity of ε-capro-lactam (Percent) | Selectivity of O-acetylcyclo-hexanoneoxime (Percent) |
|---|---|---|---|---|
| 60 | 1 | 12 | 94 | 90 |
|  | 10 | 52 | 93 | 92 |
|  | 30 | 83 | 94 | 90 |
|  | 60 | 96 | 89 | 86 |
|  | 80 | 98 | 81 | 80 |
|  | 100 | 100 | 76 | 68 |
|  | 120 | 100 | 73 | 43 |
| 100 | 0.5 | 53 | 93 | 89 |
|  | 1 | 65 | 90 | 90 |
|  | 3 | 77 | 91 | 87 |
|  | 10 | 92 | 88 | 86 |
|  | 30 | 99 | 84 | 80 |
| 120 | 0.2 | 62 | 91 | 81 |
|  | 0.5 | 76 | 86 | 80 |
|  | 1 | 88 | 83 | 78 |
|  | 3 | 95 | 79 | 76 |
|  | 10 | 100 | 68 | 53 |
| 130 | 0.2 | 76 | 79 | 58 |
|  | 0.5 | 86 | 76 | 53 |
|  | 1 | 97 | 64 | 48 |
|  | 3 | 100 | 63 | 46 |
|  | 10 | 100 | 58 | 32 |

EXAMPLE 3

By using the same reaction apparatus as in Example 1, N-acetylcaprolactam and cyclohexanone were mixed together at such various proportions as are shown in Table 3 and the mixture was heated to react at 90° C. for 5 hours. The reaction product solution was separated into respective components by gas chromatographic analysis and rectification to obtain the results shown in Table 3.

TABLE 3

| Materials used | | | Conversion percent | | Selectivity (percent) | | Yield (g.) | |
|---|---|---|---|---|---|---|---|---|
| Cyclohexa-noneoxime (A) (mols) | N-acetyl-caprolac-tam (B) (mols) | Mol ratio (A)/(B) | Cyclo-hexanone-oxime | N-acetyl-caprolac-tam | ε-Capro-lactam | O-acetyl-cyclohexa-noneoxime | ε-Capro-lactam | O-acetyl-cyclohexa-noneoxime |
| 0.0014 | 0.2 | 0.007 | 100 | 0.7 | 89 | 90 | 0.1 | 0.2 |
| 0.002 | 0.2 | 0.01 | 100 | 1 | 91 | 90 | 0.2 | 0.25 |
| 0.02 | 0.2 | 0.1 | 98 | 9 | 90 | 92 | 1.8 | 2.7 |
| 0.1 | 0.1 | 1.0 | 91 | 89 | 91 | 91 | 9.1 | 12.8 |
| 0.15 | 0.05 | 3 | 29 | 92 | 92 | 93 | 4.7 | 6.2 |
| 0.2 | 0.02 | 10 | 11 | 99 | 91 | 90 | 2.0 | 3.0 |
| 0.2 | 0.0067 | 30 | 3 | 100 | 90 | 91 | 0.6 | 0.8 |
| 0.2 | 0.002 | 100 | 1 | 100 | 91 | 90 | 0.2 | 0.25 |
| 0.2 | 0.016 | 125 | 0.8 | 100 | 85 | 89 | 0.1 | 0.2 |

As will be understood from the data given in Table 3, when the ratio (number of mols of cyclohexanoneoxime per mol of N-acetylcaprolactam) is smaller than 0.01, the conversion of N-acetylcaprolactam will become so small that the yield of the objective product will also decrease. In case the ratio is larger than 100, the conversion of cyclohexanoneoxime will become so small that the yield of the objective product will decrease. Thus the proper range is 0.01 to 100 mols of cyclohexanoneoxime per mol of N-acetylcaprolactam.

EXAMPLE 4

15.5 g. (0.1 mol) of N-acetylcaprolactam and 11.3 g. (0.1 mol) of cyclohexanoneoxime were mixed together with the addition of 30 cc. of each of various organic solvents shown in Table 4. The mixture was charged in an autoclave and allowed to react at 60° C. for 15 hours while being agitated. After removing the solvent, the reaction product was rectified and separated into respective components. The analysis was also conducted by the use of gas chromatography. The results are shown in Table 4.

TABLE 4

| Solvent | Composition of the reaction product solution (mol percent) | | | |
|---|---|---|---|---|
| | N-acetyl-caprolactam | Cyclo-hexanone-oxime | ε-Capro-lactam | O-acetyl-cyclohexa-noneoxime |
| None | 14.5 | 12.5 | 30 | 31 |
| Benzene | 12 | 12.5 | 36 | 35 |
| Toluene | 11 | 10 | 37 | 38 |
| Xylene | 12 | 10 | 38 | 37 |
| Ethylbenzene | 12 | 11 | 36 | 36 |
| Isopropylbenzene | 11 | 11 | 35 | 37 |
| Tetralin | 10 | 12 | 37 | 37 |
| Ethylene dichloride | 12 | 12 | 37 | 36.5 |
| Trichlorethylene | 11 | 13 | 36 | 38 |
| Chloroform | 13 | 12 | 38 | 37 |
| Carbon tetrachloride | 12 | 10 | 35 | 37.5 |
| Tetrachlorethane | 13 | 12 | 36 | 35 |
| Isopropyl chloride | 12 | 11 | 37 | 37 |
| Amyl chloride | 11 | 11 | 36 | 35 |
| Ethyl bromide | 11 | 10 | 37 | 35 |
| Chlorobenzene | 13 | 12 | 36 | 36 |
| Petroleum benzene | 14 | 12 | 35 | 36 |
| Ligroin | 13 | 11 | 35 | 37 |
| n-Pentane | 11 | 10 | 37 | 37 |
| n-Hexane | 13 | 12 | 36 | 35 |
| n-Heptane | 12 | 11 | 36 | 37 |
| Cyclohexane | 12 | 11 | 35 | 38 |
| Methylisobutyl ketone | 13 | 13 | 36 | 36 |
| Methylethyl ketone | 10 | 11 | 36 | 36 |
| Ethyl acetate | 11 | 13 | 36 | 37 |
| Cyclohexyl acetate | 13 | 13 | 35 | 36 |
| Methyl formate | 12 | 11 | 36 | 37 |
| Methyl propionate | 10 | 11 | 38 | 37 |
| Isopropylether | 11 | 13 | 38 | 35 |
| Dioxane | 11 | 12 | 37 | 34 |

As apparent from the above, when such organic solvent is added to the reaction system, the amounts of ε-caprolactam and O-acetylcyclohexanoneoxime will increase to be larger than in case the solvent is not added.

EXAMPLE 5

15.5 g. (0.1 mol) of N-acetylcaprolactam and 22.6 g. (0.2 mol) of cyclohexanoneoxime were mixed together and were made to react at 90° C. for 6 hours by using the same apparatus as in Example 1. The results of the reaction are shown in Table 5.

Also, as a control, N-acetylcaprolactam and an amine were made to react with each other. Thus, as an amine, 0.08 mol of each of aniline and pyrrolidine was used and mixed with 0.04 mol of N-acetylcaprolactam and 70 cc. of tetrahydrofuran as a solvent and the mixture was heated at 90° C. for 20 hours. After removing the solvent and excess oxime under a reduced pressure the reaction product was rectified or recrystallized to recover the desired products. The results are shown in Table 5. The yield was calculated on the basis of N-acetylcaprolactam used.

As shown in Table 5, according to the process of the present invention in which cyclohexanoneoxime is used, the yield of ε-caprolactam is 92%, whereas, in case an amine (aniline or pyrrolidine) is made to react with N-acetylcaprolactam, the yield of ε-caprolactam is as low as 48 or 31%.

What is claimed is:

1. A process for producing ε-caprolactam and O-acetyl-cyclohexanone oxime comprising reacting 0.01 to 100 mols of cyclohexanone oxime with one mol of N-acetyl-caprolactam at a temperature of 30 to 120° C. for 10 minutes to 100 hours in the presence of an organic solvent in an amount of 0 to 20 times the total weight of N-acetylcaprolactam and cyclohexanone oxime.

2. A process as claimed in claim 1 wherein the temperature is 60–100° C.

3. A process as claimed in claim 1 wherein the amount of cyclohexanoneoxime is 0.1–30 mols per mole of N-acetylcaprolactam.

4. A process as claimed in claim 1 wherein the solvent is selected from the group consisting of aromatic hydrocarbons, alicyclic hydrocarbons, aliphatic hydrocarbons, their halides, ethers, acetals, esters and ketones.

5. A process as claimed in claim 1 wherein the amount of the solvent is 0.1–10 times the weight of total of N-acetylcaprolactam and cyclohexanoneoxime.

TABLE 5

| | N-acetyl-caprolactam (mols) | Oxime or amine | Solvent | Reaction temperature (° C.) | Time (hours) | Yield of— | |
|---|---|---|---|---|---|---|---|
| | | | | | | ε-Caprolactam (percent) | Acetylate (percent) |
| Process of the present invention | 0.1 | 0.2 mol of cyclohexanoneoxime | None | 90 | 8 | 92 | 91 |
| Control (reaction with amine) { | 0.04 | 0.08 mol of aniline | 70 cc. of tetrahydrofuran | 90 | 20 | 48 | *90 |
| | 0.04 | 0.08 mol of pyrrolidine | do | 90 | 20 | 31 | **76 |

NOTE.—The product marked with * was acetanilide and the product marked with ** was N-acetylpyrrolidine.

References Cited

UNITED STATES PATENTS 2,249,177   7/1941   Schlack _____ 260—239.3 A

HENRY R. JILES, Primary Examiner

R. T. BOND, Assistant Examiner

U.S. Cl. X.R.

260—239.3 R, 560 A, 566 AE